(12) United States Patent
Lin (10) Patent No.: US 9,367,084 B2
(45) Date of Patent: Jun. 14, 2016

(54) ELECTRONIC DEVICE

(71) Applicant: Chiun Mai Communication Systems, Inc., New Taipei (TW)

(72) Inventor: Ding-Yu Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/517,358

(22) Filed: Oct. 17, 2014

(65) Prior Publication Data

US 2015/0131221 A1    May 14, 2015

(30) Foreign Application Priority Data

Nov. 13, 2013    (CN) .......................... 2013 1 0569493

(51) Int. Cl.
*H05K 1/00*    (2006.01)
*G06F 1/16*    (2006.01)

(52) U.S. Cl.
CPC ............ *G06F 1/1613* (2013.01); *G06F 1/1626* (2013.01); *G06F 1/1643* (2013.01); *G06F 1/1656* (2013.01)

(58) Field of Classification Search
USPC ...................................... 361/679.21, 749, 748
See application file for complete search history.

(56) References Cited

U.S. PATENT DOCUMENTS

2013/0234938 A1*    9/2013    Xue ........................ G06F 1/169
345/158

FOREIGN PATENT DOCUMENTS

| JP | 2008532115 A | 8/2008 |
| JP | 2008269263 A | 11/2008 |
| TW | M444687 U1 | 1/2013 |
| WO | 2011013588 A1 | 2/2011 |

* cited by examiner

*Primary Examiner* — Andargie M Aychillhum
(74) *Attorney, Agent, or Firm* — Novak Druce Connolly Bove + Quigg LLP (57) ABSTRACT

An electronic device includes a first housing, a printed circuit board (PCB), and a touch apparatus. The touch apparatus includes a touch assembly, a key assembly, and a mounting assembly. The touch assembly includes a touch screen having a touch portion. The mounting assembly includes a sealing frame. The key assembly is mounted on the PCB and is received in the sealing frame, the touch assembly is located at a first side of the first housing and is coupled to the PCB, a second side of the first housing is received in the sealing frame, and the key assembly is aligned with the touch portion.

16 Claims, 8 Drawing Sheets

ELECTRONIC DEVICE

FIELD

The subject matter herein generally relates to electronic devices, and particularly to a waterproof electronic device.

BACKGROUND

Electronic devices usually define various holes in their housings to allow connection of peripheral devices such as keys, screens, and so on. However, contaminants such as water may penetrate into inside of the electronic device through the holes and degrade performance of or damage the device.

BRIEF DESCRIPTION OF THE DRAWINGS

Implementations of the present technology will now be described, by way of example only, with reference to the attached figure, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an EPROM. The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

The present disclosure is described in relation to an electronic device.

Figure 1:
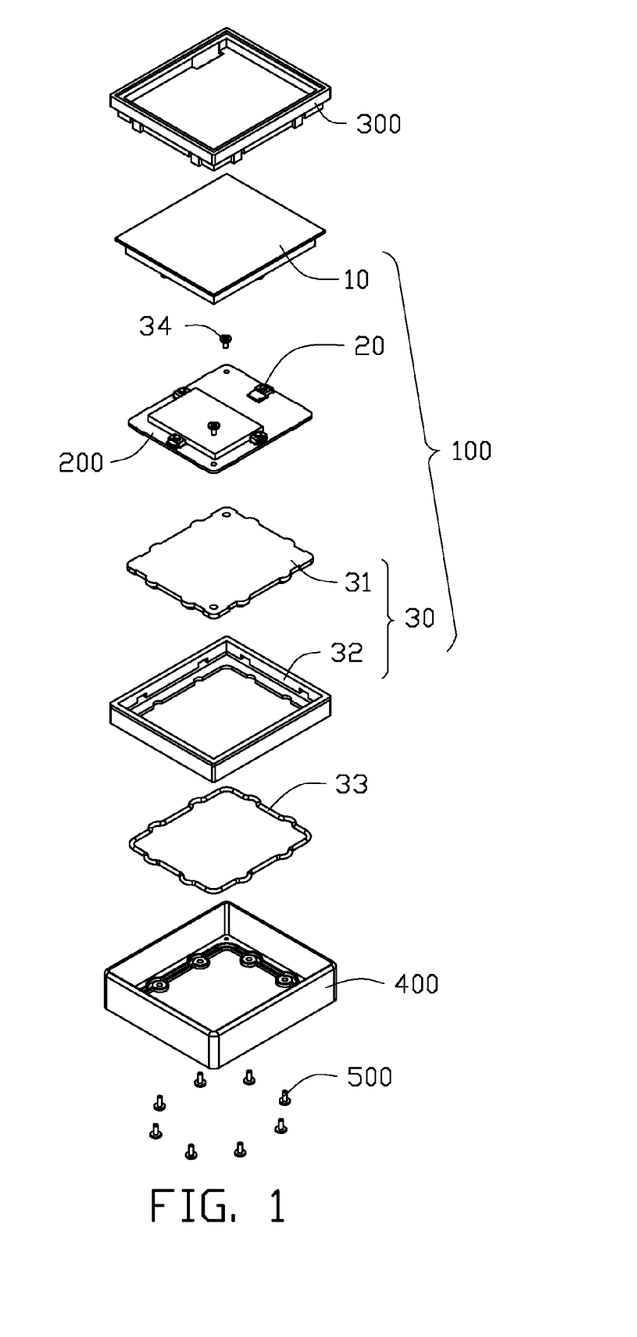
FIG. 1 is an exploded, isometric view of an electronic device, according to an exemplary embodiment.

FIG. 1 illustrates an electronic device 1, according an exemplary embodiment. The electronic device 1 includes a touch apparatus 100, a printed circuit board (PCB) 200, a first housing 300, a second housing 400, and a plurality of locking members 500. The touch apparatus 100 includes a touch assembly 10, a key assembly 20, and a mounting assembly 30. The touch assembly 10 is mounted on the mounting assembly 30 and is received in the first housing 300. The key assembly 20 is fixed to the PCB 200 and is mounted on the mounting assembly 30. The touch apparatus 100, the PCB 200, and the first housing 300 are accommodated in the second housing 400. In at least one embodiment, the plurality of locking members 500 may include eight screws, and the touch apparatus 100 is secured to the second housing 400 via the plurality of locking members 500.

Figure 2:
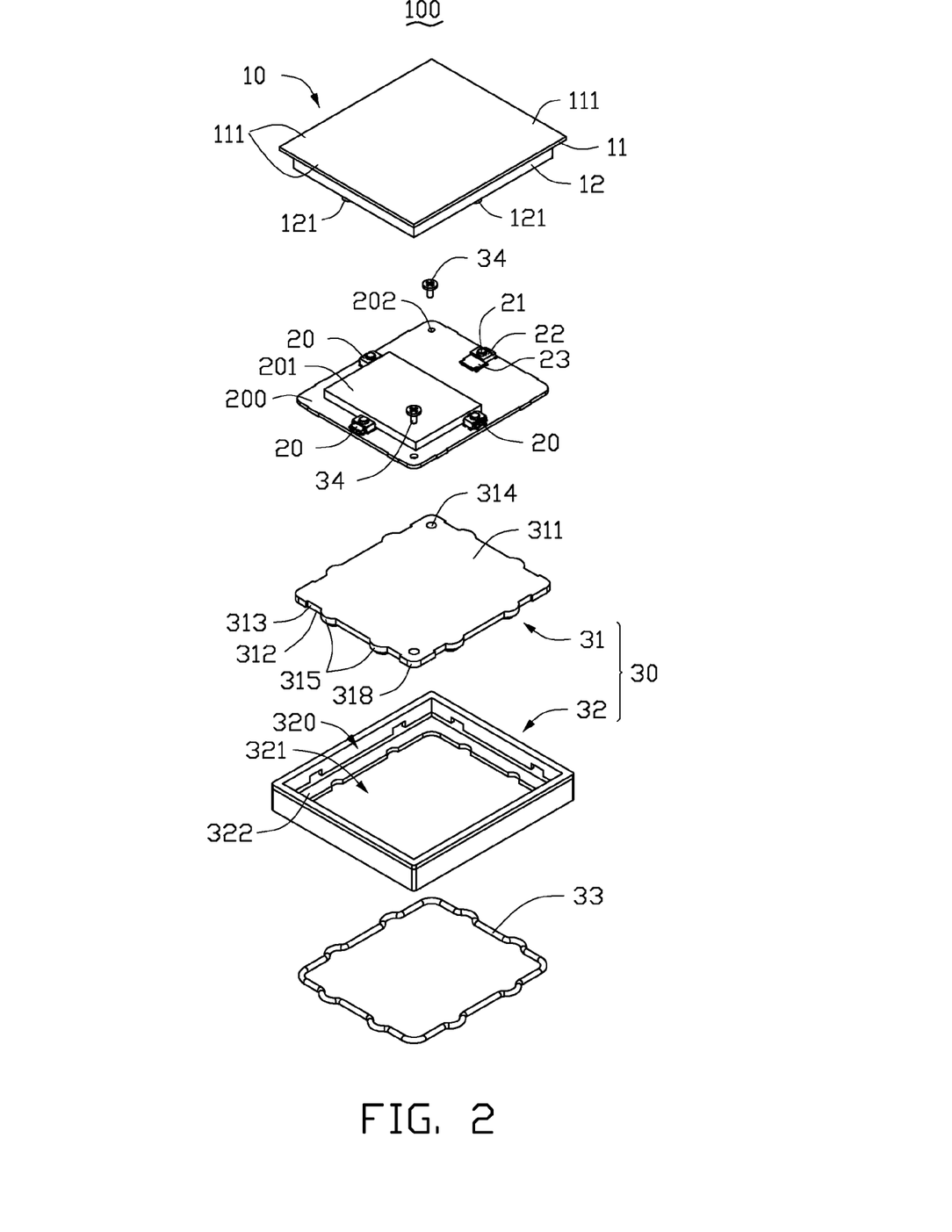
FIG. 2 is an exploded, isometric view of a touch apparatus of the electronic device of FIG. 1.
Figure 3:
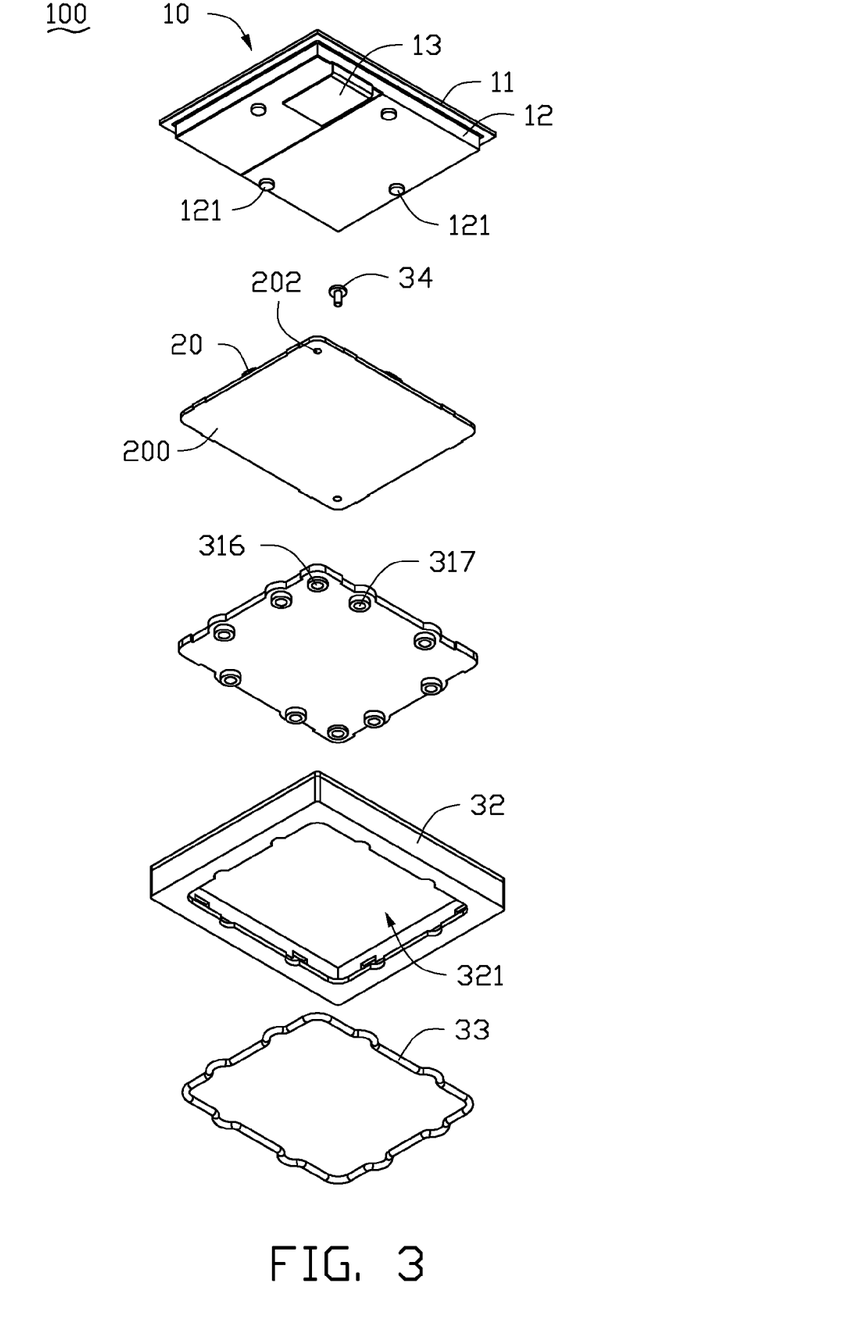
FIG. 3 is similar to FIG. 2, but shown from another angle.

FIG. 2 and FIG. 3 illustrate the touch assembly 10 including a touch screen 11, an actuating portion 12, and a flexible printed circuit board (FPC) 13 electronically coupled to the actuating portion 12. The touch screen 11 forms four touch portions 111 at peripheral edges. A first side of the touch screen 11 is served as a human-computer interface, and the actuating portion 12 is located at a second side of the touch screen 11. The actuating portion 12 defines a plurality of pressing block 121.

In at least one embodiment, the number of the key assembly 20 is four. Each key assembly 20 includes a key 21, a fixing portion 22, and a connection portion 23. The key 21 is mounted on the fixing portion 22, and the fixing portion 22 is coupled to the connection portion 23.

The mounting assembly 30 includes a mounting board 31, a sealing frame 32, and a plurality of fasteners 34. The mounting board 31 is substantially a rectangular board, and includes a top surface 311, a bottom surface 312, and a peripheral surface 318 connected between boundaries of the top surface 311 and the bottom surface 312. The top surface 311 defines two mounting holes 314 at two opposite corners. The peripheral surface 318 includes four connection surfaces 313 connected in turn, and each connection surface 313 protrudes two protrusions 315. The bottom surface 312 forms a plurality of first hollow cylinders 316 and a plurality of second hollow cylinders 317. In at least one embodiment, the number of the first hollow cylinders 316 is two, and the number of the second hollow cylinders 317 is eight. The two first hollow cylinders 316 are opposite to the two mounting holes 314, and each of the second hollow cylinders 317 corresponds to each protrusion 315.

The sealing frame 32 is substantially a rectangular hollow frame and defines an accommodation space 320. In at least one embodiment, the sealing frame 32 is made of flexible materials, such as a rubber, for example. The sealing frame 32 further includes a bottom wall 322, the bottom wall 322 defines an accommodation hole 321 for engaging the mounting board 31.

A sealing ring 33 is mounted on a bottom wall of the second housing 400. The sealing ring 33 is made of flexible materials, and is fitted around peripheral surface 318 of the mounting board 31. In at least one embodiment, the plurality of fasteners 34 can be two screws.

The key assembly 20 is positioned on the PCB 200 via the fixing portion 22. In at least one embodiment, the four key assemblies 20 are positioned adjacent to four flanges of the PCB 200. The connection portion 23 is coupled to a control component 201 integrated on the PCB 200. Additionally, the PCB 200 defines two matching holes 202 corresponding to the two mounting hole 314, respectively.

Figure 4:
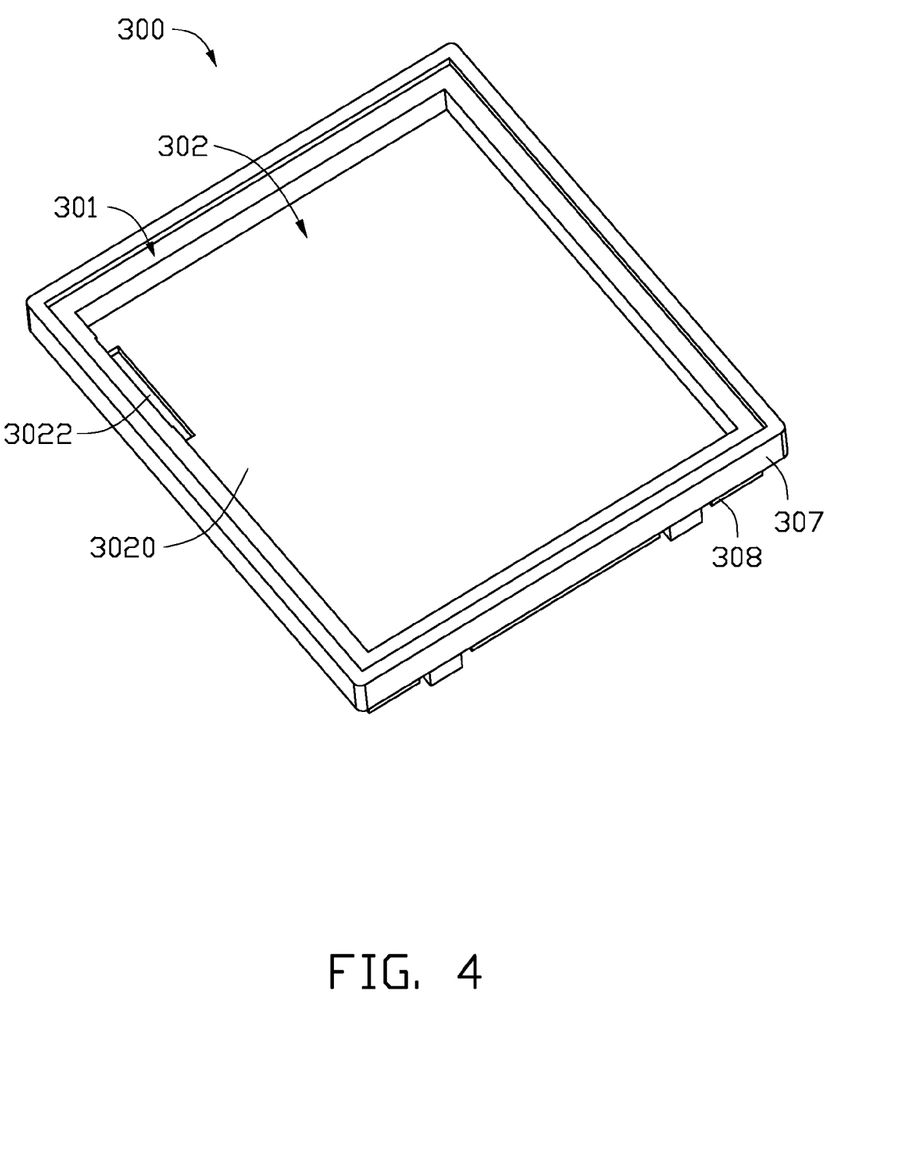
FIG. 4 is an isometric view of a first housing of the electronic device of FIG. 1.
Figure 5:
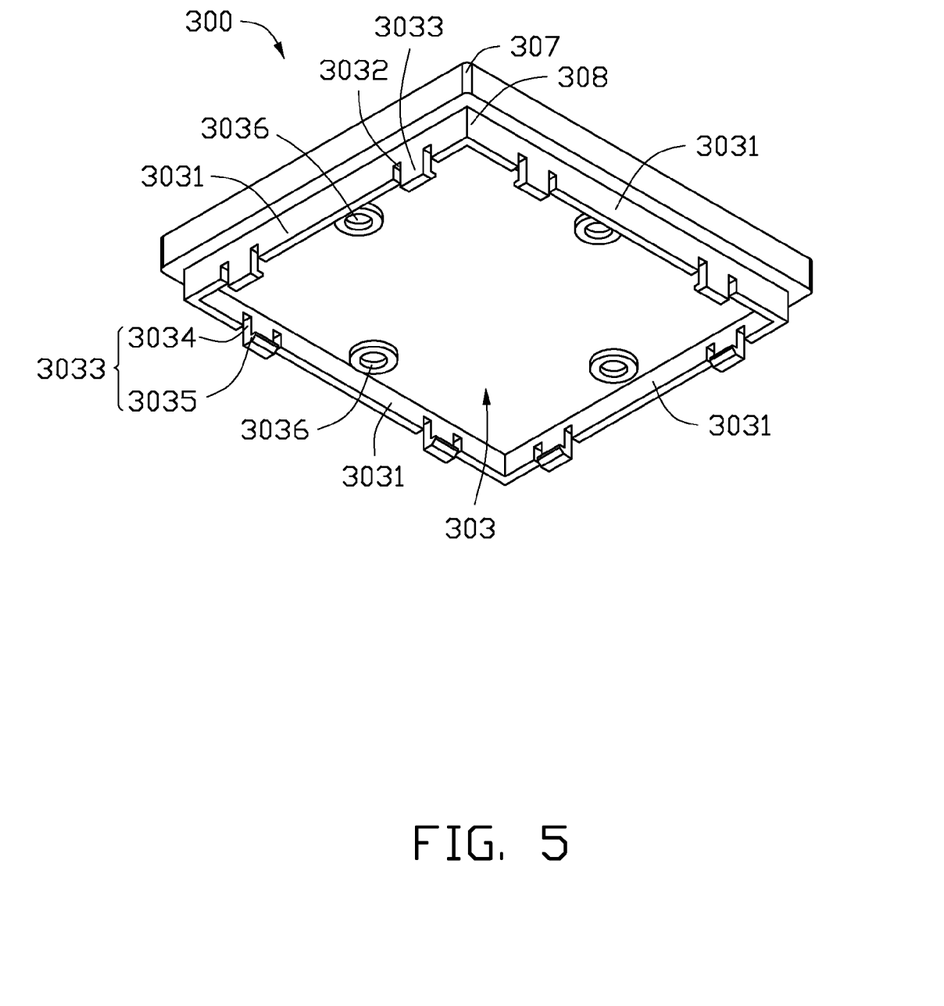
FIG. 5 is similar to FIG. 4, but shown from another angle.

FIG. 4 and FIG. 5 illustrate the first housing 300 including a first portion 307 and a second portion 308, and a size of the second portion 308 is less than a size of the first portion 307. The first portion 307 defines a first receiving groove 301 on a surface, thereby forming a carrying wall 3020. The carrying wall 3020 defines a second receiving groove 302 communicating with the first receiving groove 301. In addition, the carrying wall 3020 further defines a connection hole 3022 adjacent to a flange of the first housing 300. The second portion 308 includes four sidewalls 3031 for cooperatively defining a third receiving groove 303. Thus, the third receiving groove 303 and the second receiving groove 302 are formed two opposite sides of the carrying wall 3020. Each sidewall 3031 defines two latching grooves 3032 and protrudes a hook 3033 from a bottom wall of the latching groove 3032. Each hook 3033 includes a securing portion 3034 and a resisting portion 3035. An end of the securing portion 3034 is connected to the bottom wall of the latching groove 3032, and the resisting portion 3035 is perpendicular to a distal end of the securing portion 3034. Further, a plurality of blocks 3036 are protruded from the carrying wall 3020, and extend towards the third receiving groove 303. In at least one embodiment, the number of the plurality of blocks 3036 is four, and each block 3036 is a ring shaped and is aligned with each key 21.

Figure 6:
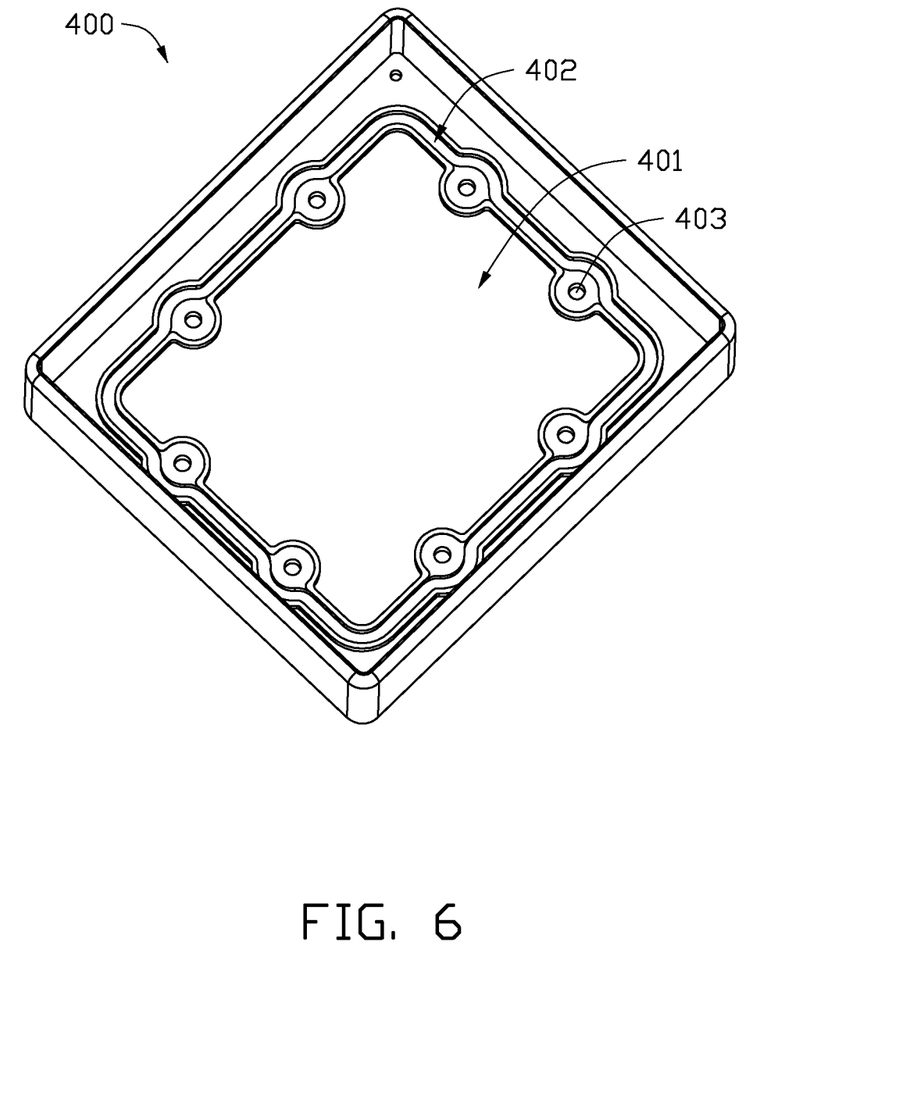
FIG. 6 is an isometric view of a second housing of the electronic device of FIG. 1.

FIG. 6 illustrates the second housing 400 defining an accommodation groove 401. A fixing groove 402 and a plurality of fixing holes 403 are defined on a bottom wall of the accommodation groove 401 for engaging the mounting board 31. In at least one embodiment, the number of the plurality of fixing holes 403 is eight, and each fixing hole 403 corresponds to each second hollow cylinders 317 of the mounting board 31.

Figure 7:
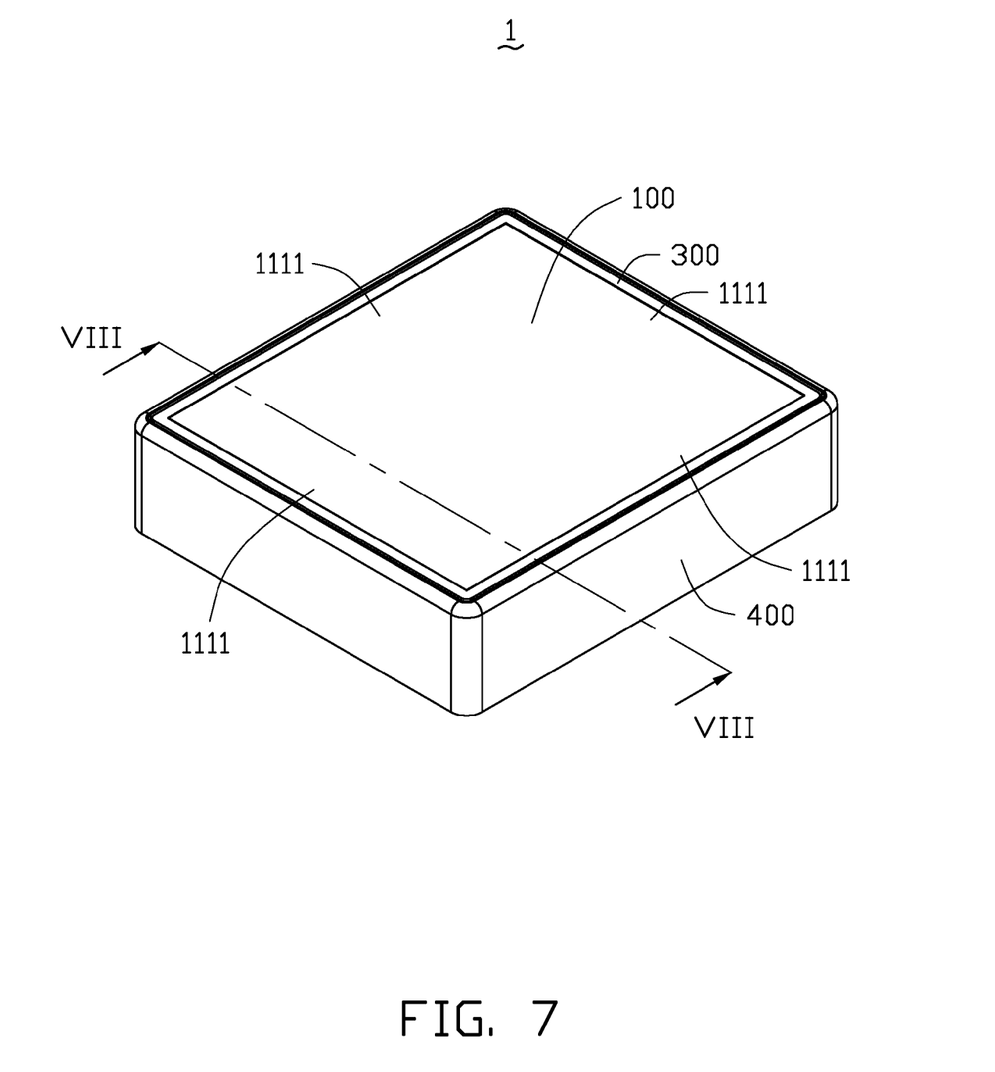
FIG. 7 is an assembled, isometric view of the electronic device of FIG. 1.
Figure 8:
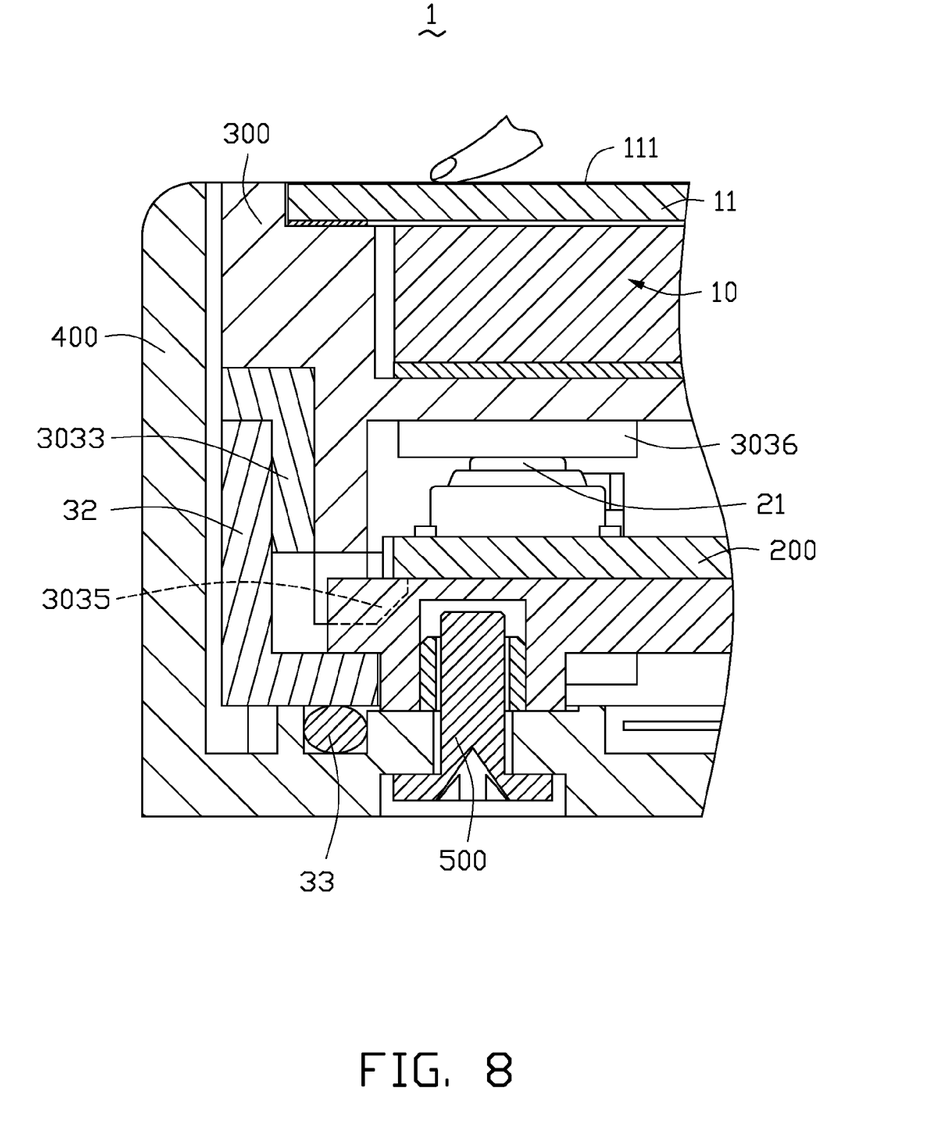
FIG. 8 is a cross-sectional view taken along line VIII-VIII of FIG. 7.

Also referring to FIG. 7 and FIG. 8, in assembly, the key assembly 20 is mounted on the PCB 200. The fastener 34 passes through the first hollow cylinder 316, the mounting hole 314, and the matching hole 202 to lock the PCB 200 at the mounting board 31. The mounting board 31 is received in the accommodation hole 321 of the sealing frame 32, thus, the peripheral surface 318 and the protrusions 315 of the mounting board 3331 resist the bottom wall 322 of the sealing frame 32, and the first hollow cylinders 316 and the second hollow cylinders 317 are exposed from the accommodation hole 321. Additionally, the touch assembly 10 is received in the second receiving groove 302, and then the actuating portion 12 resists the carrying wall 3020, and the touch screen 11 is fixed in the first receiving groove 301. The FPC 13 passes the connection hole 3022 and is received in the first receiving groove 301. Thus, the FPC 13 can be coupled to the control component 201 to allow the touch screen 11 to be electronically connected to the PCB 200.

The second portion 308 of the first housing 300 is received in the accommodation space 320. The sidewalls 3031 of the third receiving groove 303 surround the PCB 200, and the resisting portion 3035 of the hook 3033 resists the PCB 200 to secure the PCB 200 into the third receiving groove 303. Since the first housing 300 resists the sealing frame 32, water on the touch screen 11 cannot penetrate into inside of the third receiving groove 303 via the sealing frame 32. Further, the first housing 300, the touch apparatus 100, and the PCB 200 are received in the accommodation groove 401 of the second housing 400. Then, the mounting board 31 is latched into the fixing groove 402, the sealing ring 33 is mounted on the bottom wall of the accommodation groove 401, and resists between the bottom wall of the accommodation groove 401 and the mounting board 31. The locking member 500 passes through the fixing hole 403 and the second hollow cylinder 317 to fix the second housing 400 to the mounting board 31.

In use, a touch center 1111 of the touch portion 111 is pressed, both the touch assembly 10 and the first housing 300 tilt along a direction of a pressing force applied to the touch center 1111. Then, the sealing frame 32 is deformed, and the resisting portion 3035 of the hook 3033 is moved away from the PCB 200. Therefore, the block 3036 resists the key 21 aligned with the touch portion 111 to actuate the key 21, thereby enabling the touch screen 11.

In summary, the key 21 of the touch apparatus 100 is received in an internal of the electronic device 1, which can effectively utilize a space of the touch screen 11. In addition, the third receiving groove 303 is received in the accommodation space 320 of the sealing frame 32, the mounting board 31, the PCB 200, and the key assembly 20 are received in the accommodation hole 321 of the sealing frame 32. Thus, contaminants such as water cannot penetrate into inside of the electronic device 1 to increase performance of the electronic device 1.

The embodiments shown and described above are only examples. Many details are often found in the art such as the other features of an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a first housing;
a printed circuit board (PCB); and
a touch apparatus comprising:
   a touch assembly comprising a touch screen having a touch portion;
   a key assembly; and
   a mounting assembly comprising a sealing frame;
wherein the key assembly is mounted on the PCB and is received in the sealing frame, the touch assembly is located at a first side of the first housing and is coupled to the PCB, a second side of the first housing is received in the sealing frame, and the key assembly is aligned with the touch portion;
wherein the touch assembly further comprises an actuating portion and a flexible printed circuit board (FPC), the actuating portion is located at the touch screen, the FPC is connected to the actuating portion, the first housing comprises a carrying wall and defines a first receiving groove and a second receiving groove, the touch assembly is received in the second receiving groove, the touch screen is fixed in the first receiving groove, and the actuating portion resists the carrying wall.

2. The electronic device as claimed in claim 1, wherein the carrying wall further defines a connection hole, a control component is integrated on the PCB, the FPC passes through the connection hole and is coupled to the control component.

3. The electronic device as claimed in claim 2, wherein the key assembly comprises a key, a fixing portion, and a connection portion, the key is mounted on the fixing portion, and the fixing portion is positioned on the PCB, a first end of the connection portion is coupled to the fixing portion, a second end of the connection portion is electronically connected to the control component.

4. The electronic device as claimed in claim 1, wherein the mounting assembly further comprises a mounting board and a plurality of fasteners, the mounting board forms a plurality of first hollow cylinders, the fasteners pass through the first hollow cylinders and the PCB.

5. The electronic device as claimed in claim 4, wherein the mounting board further comprises a peripheral surface, the sealing frame defines an accommodation hole for engaging the mounting board.

6. The electronic device as claimed in claim 5, wherein the electronic device further comprises a second housing, the second housing defines an accommodation groove for engaging the mounting board, the second housing further comprises a sealing ring fitted around peripheral surface of the mounting board, the sealing frame is received in the accommodation groove, the sealing ring is mounted on the accommodation groove, and resists between the accommodation groove and the mounting board.

7. The electronic device as claimed in claim 6, wherein the mounting board further forms a plurality of second hollow cylinders, the second housing further defines a plurality of fixing holes, the electronic device further comprises a plurality of locking members, the locking members pass through the fixing holes and the second hollow cylinder to fix the second housing to the mounting board.

8. The electronic device as claimed in claim 1, wherein the sealing frame defines an accommodation space, the first portion defines a third receiving groove, the third receiving groove and the second receiving groove are formed two opposite sides of the carrying wall, the third receiving groove is received in the accommodation space, the first housing further comprises a second portion, the second portion defines a plurality of two latching grooves and protrudes a hook, the hook is connected to the latching groove, and resists the PCB.

9. An electronic device comprising:
a first housing;
a printed circuit board (PCB); and
a touch apparatus comprising:
    a touch assembly comprising a touch screen having a touch portion;
    a key assembly comprising a key; and
    a mounting assembly comprising a sealing frame;
    wherein the key assembly is mounted on the PCB and is received in the sealing frame, the touch assembly is located at a first side of the first housing and is coupled to the PCB, a second side of the first housing is received in the sealing frame; and
    wherein the touch portion is pressed, the touch assembly tilts along a direction of a pressing force applied to the touch portion to drive the first housing to move towards the key, the key is actuated to enable the touch screen;
    wherein the touch assembly further comprises an actuating portion and a flexible printed circuit board (FPC), the actuating portion is located at the touch screen, the FPC is connected to the actuating portion, the first housing comprises a carrying wall and defines a first receiving groove and a second receiving groove, the touch assembly is received in the second receiving groove, the touch screen is fixed in the first receiving groove, and the actuating portion resists the carrying wall.

10. The electronic device as claimed in claim 9, wherein the carrying wall further defines a connection hole, a control component is integrated on the PCB, the FPC passes through the connection hole and is coupled to the control component.

11. The electronic device as claimed in claim 10, wherein the key assembly further comprises a fixing portion, and a connection portion, the key is mounted on the fixing portion, and the fixing portion is positioned on the PCB, a first end of the connection portion is coupled to the fixing portion, a second end of the connection portion is electronically connected to the control component.

12. The electronic device as claimed in claim 9, wherein the mounting assembly further comprises a mounting board and a plurality of fasteners, the mounting board forms a plurality of first hollow cylinders, the fasteners pass through the first hollow cylinders and PCB.

13. The electronic device as claimed in claim 12, wherein the mounting board further comprises a peripheral surface, the sealing frame defines an accommodation hole for engaging the mounting board.

14. The electronic device as claimed in claim 13, wherein the electronic device further comprises a second housing, the second housing defines an accommodation groove for engaging the mounting board, the second housing further comprises a sealing ring fitted around peripheral surface of the mounting board, the sealing frame is received in the accommodation groove, the sealing ring is mounted on the accommodation groove, and resists between the accommodation groove and the mounting board.

15. The electronic device as claimed in claim 14, the mounting board further forms a plurality of second hollow cylinders, the second housing further defines a plurality of fixing holes, the electronic device further comprises a plurality of locking members, the locking members pass through the fixing holes and the second hollow cylinder to fix the second housing to the mounting board.

16. The electronic device as claimed in claim 9, wherein the sealing frame defines an accommodation space, the first portion defines a third receiving groove, the third receiving groove and the second receiving groove are formed two opposite sides of the carrying wall, the third receiving groove is received in the accommodation space, the first housing further comprises a second portion, the second portion defines a plurality of two latching grooves and protrudes a hook, the hook is connected to the latching groove, and resists the PCB.

* * * * *